United States Patent [19]

Borchard et al.

[11] 3,899,721

[45] Aug. 12, 1975

[54] PRINTED CIRCUIT CARD GUIDE

[75] Inventors: Edwin Harley Borchard, Brielle, N.J.; Karl-Heinz Pohl, Boulder, Colo.

[73] Assignee: Bell Telephone Laboratories, Incorporated, Murray Hill, N.J.

[22] Filed: Mar. 20, 1974

[21] Appl. No.: 452,931

[52] U.S. Cl. .......... 317/101 DH; 211/41

[51] Int. Cl.² .......... H02B 1/02

[58] Field of Search .......... 317/101 DH; 211/41, 27, 211/184, 183; 339/176 MP, 17 L, 17 LM, 17 M

[56] References Cited

UNITED STATES PATENTS

| | | | |
|---|---|---|---|
| 3,231,785 | 1/1966 | Calabro | 339/17 LM |
| 3,696,936 | 10/1972 | Straccia et al. | 211/41 |

*Primary Examiner*—David Smith, Jr.
*Attorney, Agent, or Firm*—C. H. Davis; H. R. Popper

[57] ABSTRACT

A printed circuit card rack assembly having molded snap-in card guides is described. Each printed circuit card inserted into the rack assembly is retained by a pair of stiffly resilient, slotted card guides, each guide having arcuate bumps protruding into the slot to interferingly contact the edge of a card. The resilient guides deflect and thereby provide equal pressures against the top and bottom edges of the cards. Each card guide also has cantilever elements located in the bottom or floor of its slot that extend into the slot and also provide pressure against the edges of the card. The nodes and cantilever elements of a pair of card guides cooperate to closely align the center lines of the card and an immovable connector which seatingly receives the contactbearing edge of the card.

7 Claims, 7 Drawing Figures

PRINTED CIRCUIT CARD GUIDE

BACKGROUND OF THE INVENTION

This invention relates to printed circuit card rack assemblies for holding printed circuit cards plugged into electrical connectors affixed to the rack. More particularly, the invention relates to rack-mounted slotted card guides which support a card in the rack and place forces on the card to align the electrical contacts on the card with the contacts of a mating connector.

In the present state of electronic technology components and electronic devices are mounted on printed circuit cards or boards at least one side of which has a conductive surface. The conductive surface on a card is cut out or etched in a predetermined configuration to provide circuit paths in accordance with a schematic diagram to interconnect the components and devices on the card into a circuit.

The circuits on each of a number of cards are generally interconnected by wiring between an equal number of plug type connectors into each of which one of the cards is inserted. The connectors are affixed adjacent to each other at the rear of a printed circuit card rack or tray. The rack provides a frame or cage for card guides which accommodate the cards parallel to each other in the rack while guiding a card into electrical connection with a mating one of the plug-type connectors.

Due to dimensional tolerances of the card guides, connectors, structural members of the card rack, and the printed circuit cards, the dimensions of a complete rack assembly must be such that a card fits relatively loosely therein to guarantee easy insertion and removal of the cards. As a result of the loose fit of a card in a rack, the electrical contacts on the edge of a card do not always mate perfectly with the contacts of a mating connector affixed to the rear of the tray. This can result in damage to a connector and to the edge of a circuit card upon insertion into the rack. To minimize this problem of properly mating circuit card contacts to connectors, the prior art utilizes movably mounted connectors that have a funnel shaped card entrance. The movement of the connectors is restricted but is sufficient to properly receive the contacts on the edge of a circuit card.

As the printed circuit card rack art has advanced the individual backplane wires that interconnect the terminals of a multiplicity of connectors at the rear of a card rack have been replaced with printed circuit boards having printed circuit paths that interconnect the connector terminals. This requires that the connectors no longer be movably affixed to the rear of the rack, but rather that they be more rigidly mounted on the backplane printed wiring board which is itself affixed to the rear of the rack. As a result of having connectors rigidly mounted on backplane printed wiring boards, the problem arises of properly mating the electrical contacts on the edge of a printed circuit card inserted into a rack with the contacts of a mating connector. Accordingly, there is a need for printed circuit card rack apparatus that properly aligns a card with a mating connector to assure easy insertion therein without damaging the connector or the circuit card.

SUMMARY OF THE INVENTION

The above need of the prior art is satisfied by our invention wherein we provide novel resilient card guides that closely align the contacts on the edge of a circuit card being inserted into a rack with the contacts of a mating connector which is rigidly mounted on a backplane printed wiring board.

Our novel resilient card guides each have a protrusion or tongue member which allows the guides to be quickly and easily snap-in connected to a rack at the rear of which is mounted the backplane printed circuit board with the connectors affixed thereto. The assembly forms an integrated cage that allows circuit cards to be inserted and removed in a manner well known in the art.

More particularly, our novel card guides each have a longitudinal slot which receives the top or bottom edge of a circuit card being inserted into a rack. One or more arcuate bumps or nodes are provided in the bottom of the slot to interferingly engage the edge of a card inserted into the rack. Due to the interference between the nodes and the edge of the card, the resilient card guides are deflected and a pressure is thereby applied against the top or bottom edge of the card. In addition, cantilever elements are also provided in the bottom of a card guide slot at either end thereof. The cantilever elements extend into the slot where they are deflected by the edge of a card inserted into the rack. The cantilever elements thereby also apply pressure against the top or bottom edge of the card. As a pair of our card guides is used to support a circuit card in a rack, the pressures applied to the top and bottom edges of a card by the nodes and cantilever elements equalize each other and closely center the card in a vertical direction in the rack slot wherein the card is placed. In mounting the backplane printed circuit board to the rack, the connectors mounted on the board are also vertically centered in the rack. Thus, our novel card guides closely align the center lines of a circuit card and a mating connector and thereby eliminate damaged connectors and circuit cards. At the same time our card guides firmly hold circuit cards and prevent damage thereto that may be caused by environmental stress conditions such as shock and vibration.

BRIEF DESCRIPTION OF THE DRAWINGS

Our invention will be more clearly understood by reading the following description of an exemplary embodiment of the invention in conjunction with the drawing in which.

DETAILED DESCRIPTION

Referring now to FIGS. 1A, 1B, 1C, and 1D, therein is shown our novel card guide 10 which, in accordance with this embodiment of our invention, is molded of a mixture of polycarbonate and glass fiber so that it has a stiffly resilient property. Fluorocarbon is added to the mixture to increase the lubricity of guide 10 and thereby reduce the insertion force required to insert a printed circuit card into a card rack equipped with our card guides.

Figure 2:
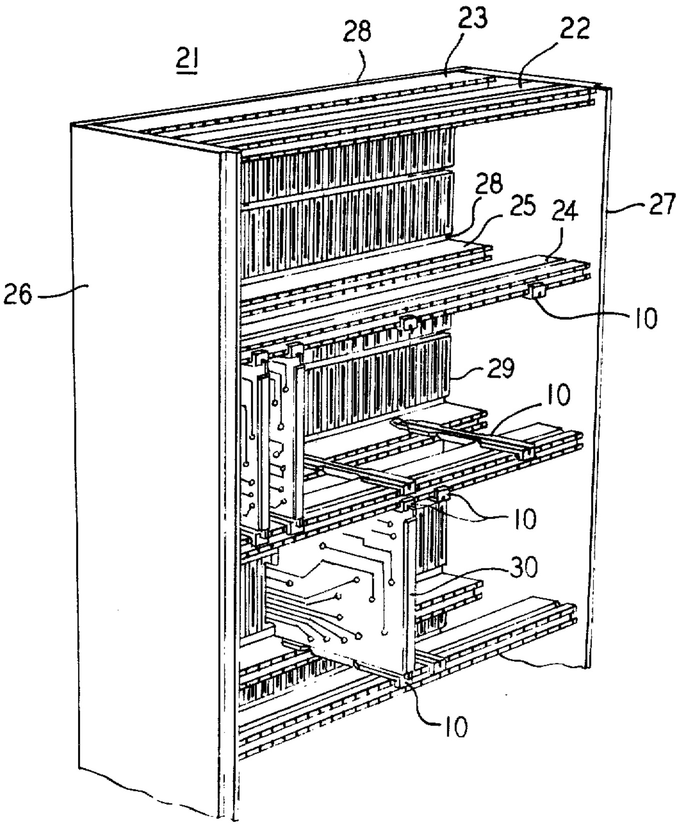
FIG. 2 is a perspective view of a multitray printed circuit card rack equipped with our card guides.

Card guide 10 includes side walls 11 and 12 which form a longitudinal slot 13. To receive a circuit card in a card rack a card guide 10 is snap-in mounted to the bottom and the top of the rack as shown in FIG. 2. Slot 13 of guide 10 at the top of the rack receives the top edge of an inserted circuit card 30 while the bottom guide 10 receives the bottom edge of the card.

Figure 1A:
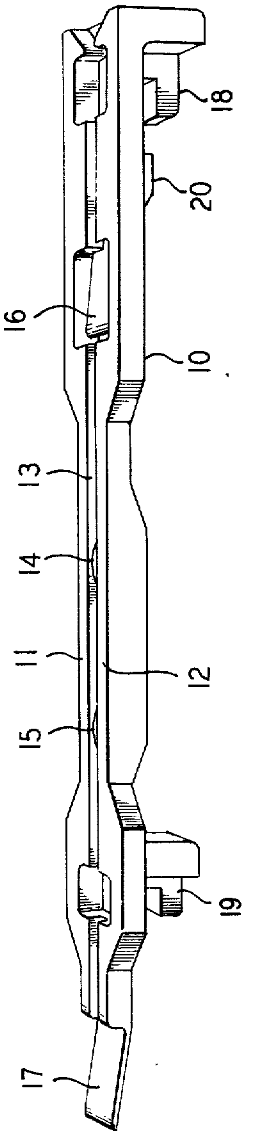
FIG. 1A is a perspective view of our novel card guide.
Figure 1B:
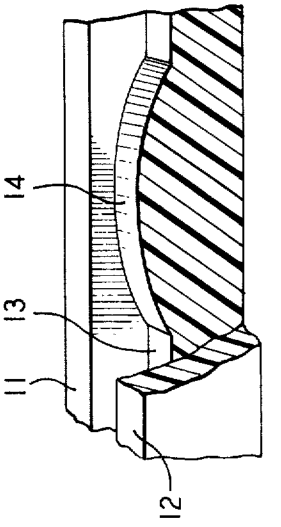
FIG. 1B is an enlarged fragmentary view of the card guide nodes that interferingly enage the edge of a card.
Figure 1C:
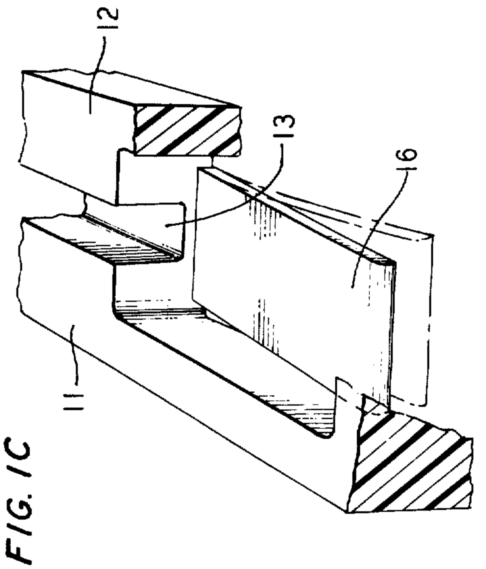
FIG. 1C is an enlarged fragmentary view of the cantilever element of our card guide.

Guide 10 further includes arcuate bumps or nodes 14 and 15 as seen in FIG. 1A and seen in greater detail in FIG. 1B. As a circuit card (not shown) is inserted into a card rack (not shown) the edges of the card interferingly engage the nodes 14 and 15 of the guides 10 holding the top and bottom edge of the card. This interference fit causes rectilinear distortion of the resilient guides and thereby places pressure on the top and bottom edges of the card. Guide 10 further includes cantilever elements 16 and 17 as seen in FIG. 1A and seen in greater detail in FIG. 1C. Cantilever elements 16 and 17 also interferingly engage the edge of a circuit card inserted in a card rack and are deflected thereby. The deflection of the cantilever elements also causes pressure to be placed on the edge of a circuit card. In FIG. 1A it can be seen that nodes 14 and 15 and cantilever elements 16 and 17 are distributed along sot 13 of guide 10. This creates a distributed pressure along the edge of a card which greatly reduces the chance of a card being inserted into a card rack at a vertical angle, while exerting pressures on the top and bottom edges of the card which closely align the center line of the inserted card with the center line of a mating connector at the rear of a card rack. This aspect of our invention will be better understood after reading the detailed descriptions of FIGS. 3 and 4 hereinafter in this specification.

Figure 1D:
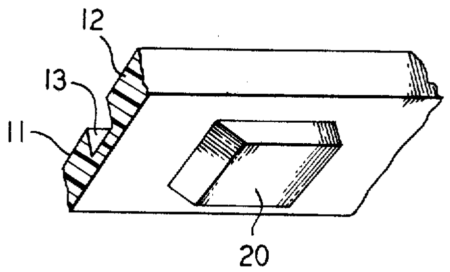
FIG. 1D is an enlarged fragmentary view of the snap-in protrusion of our card guides.

FIGS. 1A and 1D show protrusion 20 which allows our novel guide 10 to be snap-in mounted on a card rack. Protrusion 20 is discussed hereinafter in greater detail in the description of FIGS. 3 and 4.

FIG. 2 shows an assembly of three circuit card racks 21. The uppermost card rack includes support members 22, 23, 24, and 25 which are fastened to end plates 26 amd 27 to form a cagelike structure. It should be noted that members 24 and 25 serve as the lowermost support members of the uppermost card rack while simultaneously serving as the uppermost support members of the middle card rack. This may be seen in greater detail in FIG. 3. A plurality of our novel card guides 10 are snap-in mounted between members 22 and 23 or 24 and 25 in a spaced relationship to receive circuit cards 30. Only representative ones of guides 10 and cards 30 are shown in FIG. 2 so that the figure may be simplified and so that the general assembly of the rack and guides may be seen. At the rear of the card racks is mounted a backplane printed wiring board 28 on which are rigidly mounted a plurality of circuit card connectors 29.

Figure 3:
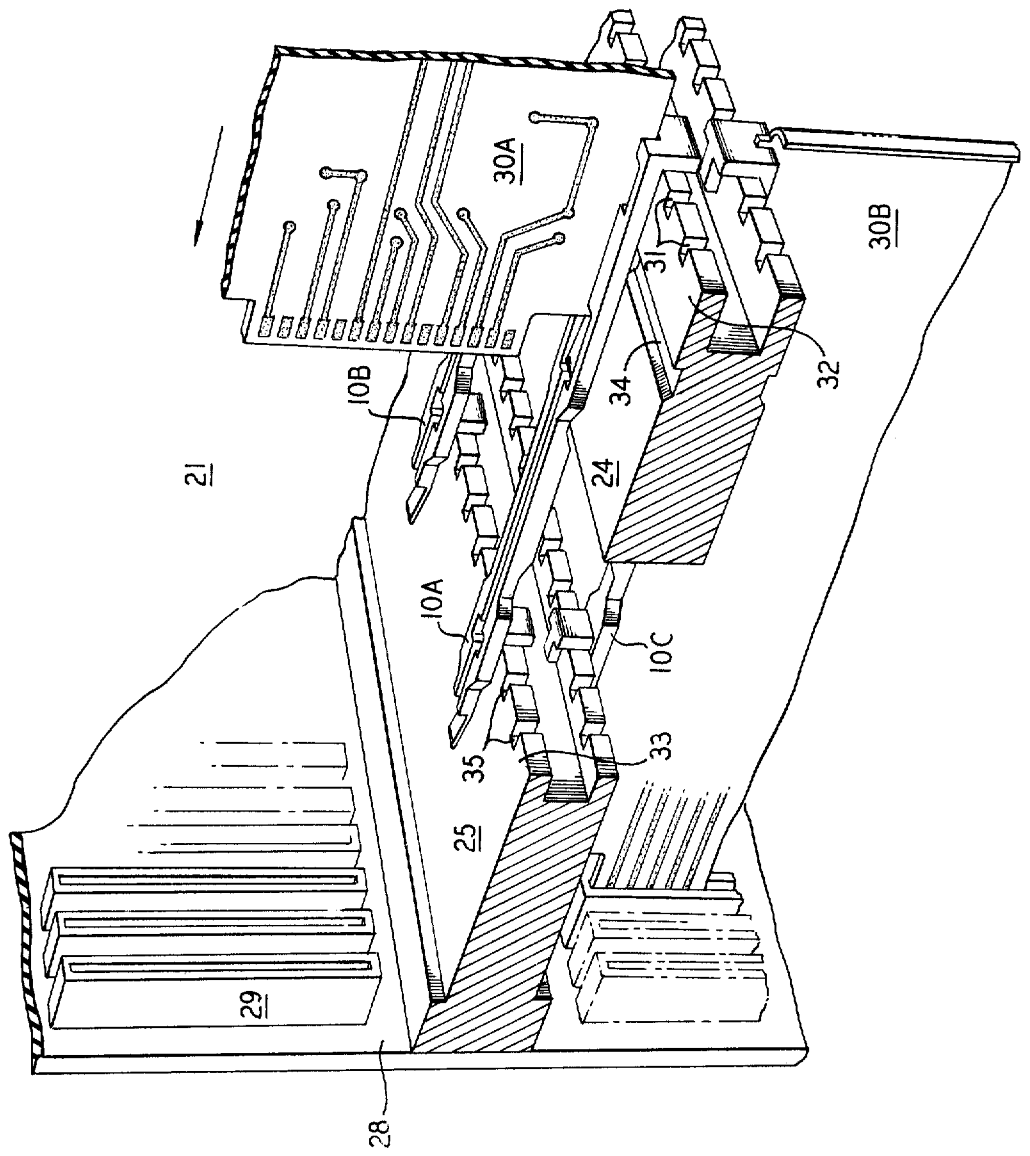
FIG. 3 is an enlarged fragmentary view of our card guide mounted in a card rack.

Turning now to FIG. 3, therein is shown an enlarged fragmentary view of card rack 21 showing our novel card guides 10A, 10B, and 10C mounted between support members 24 and 25. Only representative ones of guides 10 and cards 30 are shown so that the figure may be simplified. Backplane printed wiring board 28 is fastened to member 25 and connectors 29 are rigidly fastened to board 28. Details of how board 28 is fastened to member 25 are not shown but are well known in the art. As circuit card 30A is inserted into card rack 21 via guide 10A and another guide not shown, the center line of card 30A is aligned with the center line of connector 29 by the action of the guides. Upon being fully inserted the contacts on the edge of board 30A will properly engage the contacts of connector 29.

FIG. 3 also shows how members 24 and 25 mount guides 10A, 10B, and 10C in the card racks in which circuit cards 30A and 30B are mounted.

Support elements 22, 23, 24, and 25 can be extruded of a material such as aluminum, in a manner well known in the art, and then machined to add a plurality of equispaced notches 31 and 35, as shown in FIG. 3, which position guides 10A, 10B and 10C. It should be noted that the support elements may be extruded in a manner well known in the art, with internal hollow areas throughout their length, not shown in FIG. 3, which conserve material and which make the elements lighter without sacrificing structural strength.

Figure 4:
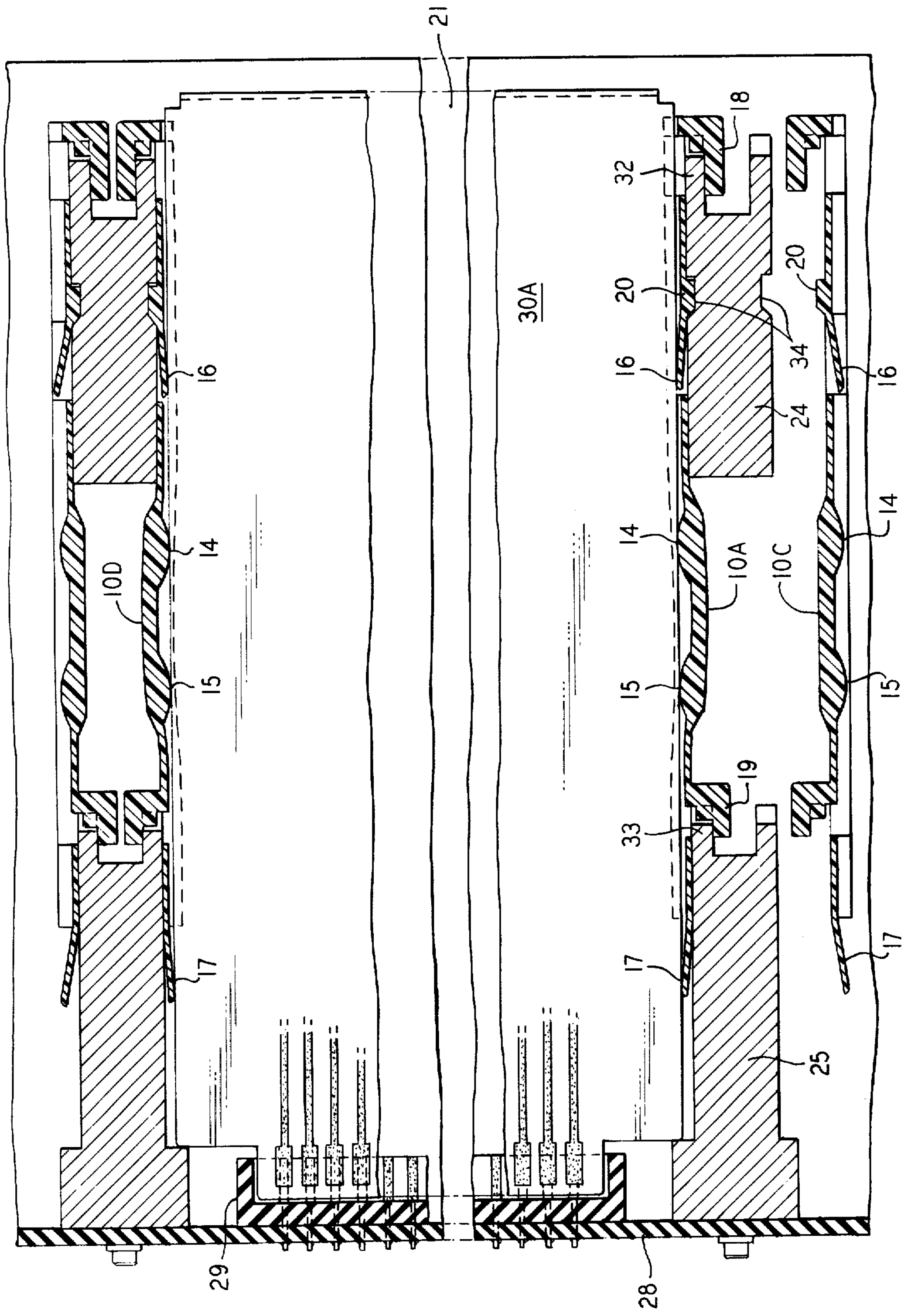
FIG. 4 is a longitudinal cross section of our card guides both in contact with and not in contact with a printed circuit card.

To understand how representative snap-in card guide 10A mounts between support elements 24 and 25, FIG. 3 must be viewed in conjunction with FIGS. 1 and 4.

To mount guide 10A, the vertical portion of its lips 18 and 19 (as seen in FIG. 1A) are placed in respective ones of notches 31 and 35 of members 24 and 25 as seen in FIG. 3. As guide 10 is pushed toward board 28 the horizontal portion of lips 18 and 19 move under extensions 32 and 33 of members 24 and 25 as can be seen in FIG. 4. Thus guide 10A is constrained both vertically and horizontally. To prevent guide 10A from being too easily removed lock-in protrusion 20, shown in FIGS. 1D and 4, is utilized. It should be noted that the side of protrusion 20 facing backplane wiring board 28 has a sloped face. As guide 10 is pushed into the rack, toward board 28, the sloped face of protrusion 20 forces the protrusion on top of extension 32 by distorting guide 10A. When guide 10A is fully inserted protrusion 20 snaps into groove 34 of member 24 as seen in FIGS. 3 and 4. As the face of protrusion 20 opposite the sloped face is vertical, guide 10 is not easily removed. Thus guide 10 is constrained longitudinally.

With this embodiment of our invention, guide 10 is designed as not to be easily removed. It will be recognized by one skilled in the art, however, that guide 10 may be modified to be relatively easily removed. An obvious modification is to change the aforementioned vertical face of protrusion 20 to a sloped face. Then a longitudinal force removing guide 10 from the card rack will again deform the guide and protrusion 20 will again be forced on top of extension 32 of member 24. With this modification guide 10 may be removed with the same amount of force as is required to insert the guide, but the guide cannot easily fall out. A simple tool, not shown, may be constructed by one skilled in the art for applying the required longitudinal force to guide 10 to remove it from the card rack.

In FIG. 4 guides 10A, 10C and 10D are shown in longitudinal cross section mounted in rack 21 with circuit card 30A inserted therein between guides 10A and 10D. Guides 10A and 10D undergo rectilinear distortion due to an interference fit of their nodes 14 and 15 with card 30A. Guide 10C is shown setting next to members 24 and 25 so that distorted guide 10A may be compared to guide 10C which is in an undistorted state.

Card 30A also deflects cantilever elements 16 and 17 of guides 10A and 10D as shown. Thus, pressure is applied to four points on the top and bottom edge of card 30A by the nodes 14 and 15 and cantilever elements 16 and 17 of guides 10A and 10D. The pressure on the top edge of card 30A will equal the pressure on the bottom edge of the card as guides 10A and 10D are identical, and the center line of circuit card 30A will be closely aligned with the center line of connector 29 before the card is fully inserted into connector 29 as shown. In this manner damage to the contacts on the edge of card 30A and to the contacts of connector 29 caused by improper engagement of the card and connector is eliminated.

As pressure is applied to several points on the top and bottom edge of circuit card 30A, the card cannot easily be inserted into rack 21 at a vertical angle or at a tilt to thereby cause misalignment of the center lines of card 30A and connector 29.

It should be understood that the invention is not limited to the embodiment described herein and it is possible to modify the structure in various ways. Thus, for example, instead of having the cantilever elements protrude into the slot of the card guides, as described hereinabove, the cantilever elements may protrude from the guides in the opposite direction and the guides are modified to have a constrained vertical movement. In this manner the cantilever elements rest against the frame of a card rack and, as a card is inserted into the rack, the guides undergo vertical movement depressing the elements and causing pressure to thereby be applied along the edge of the inserted card via the card guide slot.

What is claimed is:

1.

An elongated resilient guide member having a longitudinal channel extending therethrough said channel being defined by:

a pair of substantially parallel side walls and a floor, said side walls being disposed to receive between them the opposite faces of a printed circuit card and said floor being disposed to receive a non-facial edge of said circuit card, at least a pair of nodes disposed in said channel floor, said nodes being positioned to interfer ingly engage said non-facial edge of said circuit card, and at least one cantilever element having a fixed end integral with said channel floor and a free end extending away from said channel floor for interferingly engaging said non-facial edge, said node and said cantilever element exerting a pressure at various points of contact along said non-facial edge for constraining said circuit card against rotational motion in its facial plane.

2. The invention according to claim 1 wherein said nodes of said member are deflectable when contacted by said non-facial edge of said circuit card.

3. A circuit card rack for receiving circuit cards each having non-facial edges and for allowing said cards to be accurately mated with respective connectors rigidly mounted on said rack, said cards each being carried between pairs of oppositely disposed resilient guides characterized in that each pair of said guides which engages one of said cards, comprises:

a longitudinal slot in each guide for slideably accommodating said non-facial edges of said one of said cards, said slot having sidewalls and a floor, one of said guides of said pair having at least a pair of spaced nodes in its respective slot floor and the other guide of said pair having at least one node in its respective slot floor disposed to lie opposite said pair of nodes of said one guide, and at least one guide of said pair of guides having a plurality of cantilever elements integral with its respective slot floor for applying in cooperation with the nodes of both of said guides of said pair a pressure to each of the non-facial edges of said card that is in contact with said guide pair thereby maintaining said card in accurate alignment with a respective one of said connectors.

4. A guide for use in a frame having affixed thereto an electrical connector for holding a circuit card in non-tilting alignment with said connector, said guide comprising a longitudinally disposed resilient member having an open channel therethrough for accepting a lengthwise edge of a circuit card, cantilever spring means integral with said guide and disposed to exert an aligning force in a direction away from the base of said channel for preliminarily aligning said circuit card for further acceptance through said channel, and a plurality of localized card-bearing nodes positioned in the base of said open channel, said nodes being separated from each other by a sufficient distance less than said length of said card to inhibit rocking of said card about any of said nodes alone.

5. A guide according to claim 4 wherein said cantilever spring means includes first spring means disposed in advance of one end of said open channel.

6. A guide according to claim 3 further including second spring means located a predetermined distance from said first spring means towards the other end of said channel.

7. A guide according to claim 6 said guide further having associated therewith a deflectable protruding tongue member for securely engaging a mating surface of said frame thereby constraining the movement of said guide when mounted upon said frame.

* * * * *